United States Patent Office 2,816,877
Patented Dec. 17, 1957

2,816,877

FREE FLOWING THERMOPLASTIC VINYL ESTER COPOLYMER GRANULES AND METHOD OF PREPARING SAME

Aubrey F. Price, South Hadley, Mass., assignor to Shawinigan Resins Corporation, Springfield, Mass., a corporation of Massachusetts No Drawing. Application January 8, 1954
Serial No. 403,047

12 Claims. (Cl. 260—45.5)

This invention relates to free flowing granular copolymers of vinyl ester. More particularly, it relates to aqueous alkali soluble or dispersible free flowing thermoplastic granular copolymers of vinyl esters with unsaturated organic acids.

Alkali soluble or dispersible copolymers of vinyl esters are well known. They may be prepared by polymerizing a vinyl ester such as vinyl acetate with unsaturated organic acids such as acrylic, crotonic, methacrylic, itaconic, maleic or partially esterified maleic acids, or partial salts thereof.

These copolymers have found wide application in the adhesive, textile and paper fields due to their unique properties. One of the major advantages realized from the use of aqueous alkali soluble copolymers, as compared to homopolymers of vinyl esters, is the elimination of expensive and hazardous solvent.

It is most economical and convenient to measure, store and ship these copolymers in a dry free flowing form. However, under normal conditions encountered in storage and shipment of these resins, they tend to coalesce into one large lump or at least form sizeable cakes which are extremely difficult to recrush. For ready solubility in alkaline water or for mixing with other materials in the dry state, the product must be in relatively fine uniform granular form.

The drying of these granules is difficult because of their great tendency to coalesce at high, economical, drying temperatures. Caking of low molecular weight copolymers is likely to occur even if the drying operation is carried out as low as 35° C. The removal of water is exceedingly slow at this temperature.

It is an object of this invention to provide free flowing granular aqueous alkali soluble copolymers of vinyl esters with unsaturated organic acids. Another object is to provide an anti-caking agent which is compatible with these copolymers in their various applications. A particular object is to provide a water-insoluble anti-caking agent which may be applied to wet granular copolymers of this type to prevent sintering during drying operations at elevated temperatures.

These and other objects are attained according to this invention by thoroughly intermixing granules of thermoplastic copolymers of vinyl esters and unsaturated organic acids with powdered aqueous alkali soluble copolymers of styrene with maleic anhydride or the partial esters of maleic acid.

The powdered aqueous alkali soluble anti-caking agents may be mixed with wet or dry granules of the vinyl ester copolymers in a number of ways. A convenient method is to blend the finely ground (finer than 50 mesh) anti-caking agents with the granular copolymers in any conventional blender until the two components are thoroughly intermingled. The portion required will depend on the granule size, i. e., the surface area to be covered, and the degree of fineness of the powdered material. Generally, more than 0.1% and less than 5% of the dry weight of the granules is required and in most cases about 1% is effective.

Wet granules may then be dried by a current of air at temperatures above the sintering point of the resin in a tray or rotary type drier to the desired moisture content while maintaining their free flowing granular form.

The examples and preparations included herein are merely illustrative of this invention and are not to be construed as indicating the limits of the invention. Where parts are mentioned, they are parts by weight.

EXAMPLE I

Wet centrifuged beads of a copolymer of 97% vinyl acetate-3% crotonic acid were prepared as shown below under the heading Copolymer A Granules. To 111 parts of these beads was added 0.5 part of the powdered styrene-maleic anhydride prepared as shown below under the heading Anti-Caking Agent 1. This addition was in an amount equal to 0.5% of the dry weight of the beads. The mixture was placed in a rotating drum and thoroughly blended. The wet beads lost their glistening wet appearance and their tendency to cling together when the powder was thoroughly distributed. The beads were then free flowing and appeared dry. A sample of this composition showed a moisture content of 10% by weight.

EXAMPLE II

A powdered copolymer of styrene and the mixed mono maleate of secondary butyl alcohol and methyl alcohol (Anti-Caking Agent 2) was added to dry granules of a 95% vinyl acetate-5% crotonic acid copolymer (Copolymer B Granules) in an amount equal to 1% of the weight of the granules. The mixture was then blended in a rotating drum for 30 minutes.

The treated granules were then exposed to forced air at 65° C. in a tray drier for 5 hours. No coalescence of the granules resulted.

EXAMPLE III

Vinyl acetate-monoisopropyl maleate copolymer beads (Copolymer C Granules) were found to have a moisture content of 13%. 1.5 parts of a copolymer of styrene and mixed partial esters of maleic acid (Anti-Caking Agent 2) were added to 113 parts of these wet beads. These materials were thoroughly intermingled in a ribbon blender.

After being dried for 5½ hours with forced air at 65° C., the moisture content of the composition was less than 2%. There was no coalescence.

EXAMPLE IV

95% vinyl propionate-5% acrylic acid copolymer beads (Copolymer D Granules) contained 12% moisture. These beads were blended in a rotating drum with 1% of their dry weight of styrene-maleic anhydride copolymer (Anti-Caking Agent 1). Forced air at a temperature of 60° C. was used to reduce the moisture content of the mixture to less than 2% in 5 hours. No agglomeration of particles occurred in this drying operation.

The most valuable vinyl ester copolymers of the type treated in this invention contain only a minor portion of the acidic co-monomer. Their physical properties are, therefore, closely akin to those of homopolymers of vinyl esters in softening point, heat distortion and adhesiveness.

A great deal of work has been done in attempting to prevent the coalescence of homopolymers of vinyl esters. U. S. Patent 2,245,040 teaches the use of lubricating substances of a fatty nature to prevent agglomeration of granular polyvinyl acetate. U. S. Patent 2,317,149 discloses coating particles of polyvinyl acetate with sebacic acid and U. S. Patent 2,550,503 proposes coating granules of polyvinyl carboxylates with a rosin product. The prevention of the cohesion of rubber granules has been an analogous problem and zinc stearate, farina and talc are among the anti-caking or "dusting" agents proposed.

Various dusting agents advanced in the prior art have been satisfactory in preventing agglomeration on drying or storing but they are not suitable in the applications for which the abovementioned copolymers have been developed. These agents are either insoluble in aqueous alkaline mediums and cause milkiness or sedimentation, or they detract from the clarity, gloss, adhesion or other desirable characteristics of the copolymer films.

The anti-caking agents in this invention are limited to aqueous alkali soluble copolymers of styrene and maleic ahydride or partial esters of maleic acid. Diesters of maleic acid are not considered suitable. Partial esters may comprise reaction products of up to a total of 1 mol of alkyl alcohol with 1 mol of maleic acid. The alcohol may be methyl, ethyl, propyl, isopropyl, nonyl, decyl or any alkyl alcohol containing from 1 to 10 carbon atoms. Mixtures of such alcohols may be used.

The vinyl ester copolymers in this invention are limited to resins that are soluble in aqueous alkali. For ready solubility, it is necessary to use a copolymer having at least 0.05 mol of unsaturated organic acid for every 10 mols of vinyl ester. It is preferable, for ease of solution, to limit the saturated organic acid forming the vinyl ester to one containing from 1 to 6 carbon atoms. Examples of these acids are formic, acetic, propionic, butyric, valeric and hexanoic acids. For the same reason, the unsaturated acid in the granulated copolymer is limited to acids containing 3 to 6 carbon atoms. The unsaturated acid may be a mono- or poly-carboxylic acid. Examples of these acids are acrylic, crotonic, and maleic acids. The copolymers may be prepared in an alkaline medium resulting in the formation of partial salts of some of the unsaturated acids.

The low softening point of these thermoplastic copolymers is a factor in creating the need for anti-caking agents. Increasing proportions of unsaturated acid in the copolymer raise the softening point. This results in practically eliminating the problem of coalescence in any of these copolymers containing 20% or more by weight of an unsaturated acid. It is, therefore, desired to use no more than 1.5 mols of unsaturated acid for every 10 mols of vinyl ester. The softening point is also raised by increasing the length of the carbon chains in the ester groups or in the unsaturated acids.

Granules of the aqueous alkali soluble copolymers discussed herein are produced by various well-known methods. Fine sand-like particles may be produced by precipitating the copolymers from a solution polymerization system or particles may be formed by crushing agglomerated materials produced by this method. Comminution of a mass polymerization product may be used to obtain small particles. A convenient commercial preparation is suspension polymerization, which yields "beads" or "pearls" of fairly uniform size.

The following preparation shows a typical bead polymerization process:

*Copolymer "A" granules*

0.08 part of polyvinyl alcohol was dissolved in 50 parts of warm water contained in a stainless steel kettle equipped with a suitable mechanical stirrer and water-cooled return condenser. After cooling the resulting solution to room temperature, 0.5 part of benzoyl peroxide and 0.05 part of sodium carbonate were added. To the resulting mixture being rapidly stirred, were added 48.5 parts of freshly distilled vinyl acetate and 1.5 parts of crotonic acid and the reaction mixture was heated to its reflux temperature and the heating and stirring continued at its reflux temperature until a temperature of 85° C. was obtained. The slurry was then cooled, water washed and centrifuged in a basket centrifuge. The reaction time from the first reflux to cooling was 4 hours.

The vinyl acetate-3% crotonic acid copolymer beads produced had an average diameter of 0.5 to 0.8 mm. The viscosity of an ethanol solution containing 8.6 grams of the dry copolymer per 100 cc. was 20 centipoises at 20° C.

*Copolymer "B" granules*

Solution polymerization was used to prepare a copolymer of vinyl acetate with 5% crotonic acid.

In a kettle were dissolved 10 parts of benzoyl peroxide and 25 parts of crotonic acid in a mixture of 475 parts of vinyl acetate and 80 parts of ethanol. The solution was refluxed at 70° C. for 22 hours while maintaining constant stirring. 50 parts of water were then added and the temperature was raised to 80° C. After 30–35 parts of a mixture of water and alcohol distilled over, the temperature was lowered to 60° C. and 20 parts of ethanol were added to the remaining solution producing a clear solution with a lower viscosity.

300 parts of this solution were mixed with 750 parts of ethanol and the mixture was then poured into 8000 parts of water during vigorous agitation, whereby a fine-grained precipitate was obtained. The filtered product was dried at room temperature and then dried in a desiccator over phosphorous pentoxide to a constant weight. The viscosity of an 8.6% solution of this copolymer in ethanol was 10 centipoises at 20° C.

*Copolymer "C" granules*

Commercially important types of vinyl ester copolymers with which this invention is concerned are partial salts prepared according to the method described by Wilson in U. S. Patent 2,643,245.

One part of concentrated ammonium hydroxide (28% $NH_4OH$) was added to a mixture of 7.0 parts of mono-isopropyl maleate, 100 parts of water, 100 parts of vinyl acetate and 1.6 parts of benzoyl peroxide in a large jacketed polymerization kettle fitted with a quadrant-type agitator.

While thoroughly stirring the mixture, it was heated to reflux temperature and held there for 80 minutes. A basket centrifuge was used to separate the copolymer beads produced. 8.6 grams of the copolymer in 100 cc. benzene at 20° C. had a viscosity of 20 centipoises for the portions soluble in benzene.

*Copolymer "D" granules*

To a mixture of 47.5 parts of vinyl propionate, 0.4 part of concentrated ammonium hydroxide (28% $NH_4OH$), 0.1 part of polyvinyl alcohol and 48.5 parts of water in a kettle equipped with a stirrer and a return water-cooled condenser was added 0.5 part of acrylic acid. Under continued stirring, the mixture was raised to its reflux temperature of 68° C. and 2.0 parts of acrylic acid were slowly added during the next hour. After 2½ hours of heating, the reflux temperature began to rise until it had reached 87° C. after another hour. The reaction mixture was then cooled and the beads produced were separated from the other materials with a basket centrifuge. The viscosity of the 10.0% ethanol solution of this copolymer was 30 centipoises at 20° C.

ANTI-CAKING AGENT I

The styrene-maleic anhydride copolymer used in Examples I and IV above was made in a glass-lined polymerization kettle fitted with a quadrant-type agitator. 196 parts of maleic anhydride, 208 parts of styrene and 0.2 part of benzoyl peroxide were added to 2600 parts of benzene in the kettle and stirred at room temperature until solution was accomplished. The solution was refluxed for three hours at 79.5° C. A slurry of precipitant formed which was cooled while agitating. The reaction product was removed by filtering, spread evenly in trays and dried overnight at room temperature. Thereafter, the trays were placed in a tray drier and the solid copolymer dried to less than 1% moisture by forced air at 70° C. for 5 hours. The particles produced passed through a 300-mesh sieve.

ANTI-CAKING AGENT II

The agent used in Examples II and III was prepared in a jacketed stainless steel polymerization kettle fitted with a slow speed agitator. 62 parts of maleic anhydride, 33 parts of secondary butyl alcohol and 5 parts methanol were heated at a temperature of from 60 to 70° C. until a titration test with alkali showed a substantially constant acid value. To this mixture were added 66 parts of styrene and 0.5 part of benzoyl peroxide as a catalyst. This mixture was polymerized at a temperature of from 60 to 70° C. during the period of rapid heat evolution and the temperature was then raised to about 125° C. to complete the reaction. The dried product was then ground in a ball mill until it passed through a 200-mesh sieve.

Granular samples of Copolymers A, B, C and D were dried for 2½ hours at 50° C. and each sample caked. Each sample was thereupon re-granulated to particles with an approximate diameter of 1.5 to 2 mm. This granulating must be carefully controlled to avoid agglomeration of the material due to heat produced by the cutting operation. These freshly ground dry granules were then subjected to a "Caking Test" which consists of spreading the copolymer particles in a tray drier to a depth of 2 cm. and heating the material with a current of forced air at a temperature of 50° C. After 12 hours, the reground materials were each found to have caked again. This caking test is used as an accelerated shelf life test and granules that exhibit no coalescence after 12 hours are generally capable of being stored for 6 months at room temperature without any agglomeration occurring.

The compositions of Examples I, II, III and IV were each subjected to this caking test and all were still free flowing granules at the end of 24 hours.

The compatibility of the anti-caking agents with the granular copolymers was determined by comparing aqueous alkaline solutions of the treated and untreated granules.

15 grams of each of the untreated Copolymers A, B, C and D were dissolved in separate 100 cc. portions of water containing 5 cc. NH₄OH. All solutions were clear. Films cast on glass from each solution were also clear. Film gloss on tile was rated good in every case.

Solutions and films of the compositions of Examples I, II, III and IV were also examined, as well as solutions and films of Copolymer A Granules coated with rosin, with octadecanol and with sebacic acid, with the following results:

| Example | Solution Clarity | Film Clarity (on glass) | Film Gloss (on tile) |
|---|---|---|---|
| I | Clear | Clear | Good. |
| II | do | do | Do. |
| III | do | do | Do. |
| IV | do | do | Do. |
| Copolymer A Granules coated with rosin (1% of bead weight). | Cloudy | Cloudy | Poor. |
| Copolymer A Granules coated with Octadecanol-1 (1% of bead weight). | do | do | Do. |
| Copolymer A Granules coated with sebacic acid (1% of bead weight). | do | Slightly cloudy. | Fair. |

What is claimed is:

1. A composition comprising free flowing granules of aqueous alkali soluble copolymers of 10 mols of a vinyl ester of a saturated carboxylic acid containing from 1 to 6 carbon atoms with from 0.05 to 1.5 mols of an acid taken from the class consisting of unsaturated carboxylic acids containing from 3 to 6 carbon atoms and partial salts of unsaturated carboxylic acids containing from 3 to 6 carbon atoms, the granules being thoroughly intermingled with from 0.1 to 5% of their dry weight of a powdered aqueous alkali-soluble copolymer taken from the group consisting of copolymers of styrene-maleic anhydride and copolymers of styrene with partial esters of maleic acid, said partial esters being the reaction product of one mol of maleic acid with up to a total of one mol of alkyl alcohol containing from 1 to 10 carbon atoms.

2. A composition according to claim 1 wherein the granules are thoroughly intermingled with a powdered styrene-maleic anhydride copolymer.

3. A composition according to claim 1 wherein the granules are thoroughly intermingled with a copolymer of styrene with a partial ester of maleic acid, said partial ester being the reaction product of 1 mol of maleic acid with up to a total of 1 mol of alkyl alcohol containing from 1 to 10 carbon atoms.

4. A composition according to claim 1 wherein the granules are thoroughly intermingled with a copolymer of styrene and a mixed methyl-secondary butyl half ester of maleic acid.

5. A composition according to claim 1 wherein the vinyl ester is vinyl acetate and the unsaturated acid is crotonic acid.

6. A composition according to claim 1 wherein the vinyl ester is vinyl acetate and the unsaturated acid is monoisopropyl maleate.

7. A composition according to claim 1 wherein the vinyl ester is vinyl propionate and the unsaturated acid is acrylic acid.

8. In a process for the preparation of free flowing granules of aqueous alkali-soluble thermoplastic copolymers of 10 mols of a vinyl ester of a saturated carboxylic acid containing from 1 to 6 carbon atoms with from 0.05 to 1.5 mols of an acid taken from the class consisting of unsaturated carboxylic acids containing from 3 to 6 carbon atoms and partial salts of unsaturated carboxylic acids containing from 3 to 6 carbon atoms, the steps comprising thoroughly intermingling wet granules of these copolymers with from 0.1 to 5% of their dry weight of a powdered aqueous alkali-soluble copolymer taken from the group consisting of styrene-maleic anhydride copolymers and copolymers of styrene with partial esters of maleic acid, said partial esters being the reaction product of 1 mol of maleic acid with up to a total of one mol of alkyl alcohol containing from 1 to 10 carbon atoms.

9. In a process for the preparation of free flowing granules of copolymers of 10 mols of vinyl acetate with from 0.05 to 1.5 mols of an acid taken from the class consisting of unsaturated carboxylic acids containing from 3 to 6 carbon atoms and partial salts of unsaturated carboxylic acids containing from 3 to 6 carbon atoms, the steps comprising thoroughly intermingling wet granules of these copolymers with from 0.1 to 5% of their dry weight of a powdered aqueous alkali-soluble copolymer taken from the group consisting of styrene-maleic anhydride copolymers and copolymers of styrene with partial esters of maleic acid, said partial esters being the reaction product of 1 mol of maleic acid with up to a total of one mol of alkyl alcohol containing from 1 to 10 carbon atoms.

10. A process according to claim 9 wherein the unsaturated acid is crotonic acid.

11. A process according to claim 9 wherein the unsaturated acid is monoisopropyl maleate.

12. A process according to claim 9 wherein the unsaturated acid is acrylic acid.

References Cited in the file of this patent

UNITED STATES PATENTS 2,419,880    Blyler et al. ------------ Apr. 29, 1947